July 19, 1955  P. F. QUICK  2,713,336
MEANS FOR LUBRICATING AND COOLING THE CRANKSHAFTS
OF TWO-CYCLE COMBUSTION ENGINES
Filed Jan. 14, 1953
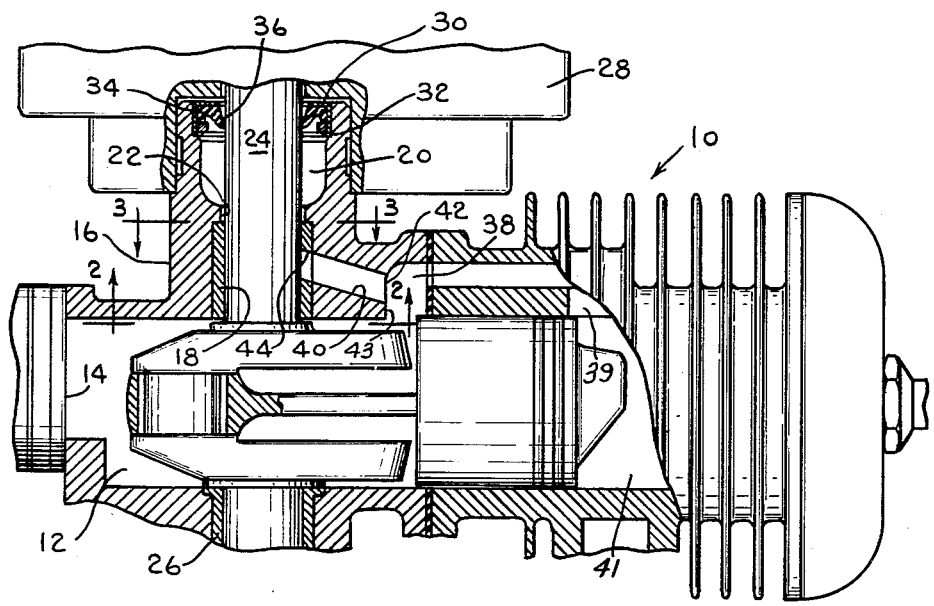
Fig. 1
Fig. 2
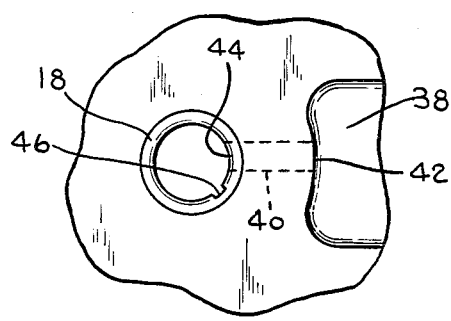
Fig. 4
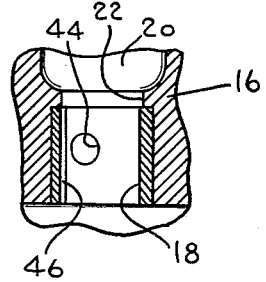
Fig. 3
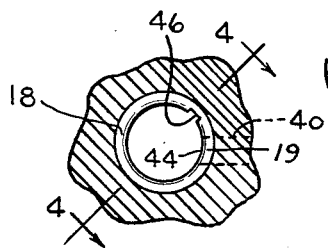
INVENTOR.
PAUL F. QUICK
BY
John W. Michael
ATTORNEY

United States Patent Office 2,713,336
Patented July 19, 1955

2,713,336

MEANS FOR LUBRICATING AND COOLING THE CRANKSHAFTS OF TWO-CYCLE COMBUSTION ENGINES

Paul F. Quick, Hartford, Wis., assignor to West Bend Aluminum Co., West Bend, Wis., a corporation of Wisconsin Application January 14, 1953, Serial No. 331,148

2 Claims. (Cl. 123—196)

This invention relates to improvements in means for lubricating and cooling the outer main bearings for crankshafts of two-cycle combustion engines.

With this type of engine, oil tends to escape from the outer end of the bearing and it is necessary to use an oil seal to prevent such escape. However, when such a seal is used, it is difficult to lubricate properly the entire bearing without the use of pressure operated valves and other relatively expensive lubricating systems.

It is an object of this invention therefore to provide a simple and inexpensive means of adequately lubricating and cooling the main bearings for crankshafts of two-cycle combustion engines.

This object is obtained by providing a velocity pressure passage extending from the inner wall of the bearing to the fuel transfer passage. The high velocity flow of fuel past this passage causes a pressure drop therein and the mist of lubricant will consequently be forced into the bearing from the crankcase.

This lubrication of the bearing may be aided by the use of a plenum chamber positioned between the bearing and the seal. Such chamber may have a small channel leading therefrom to the crankcase so that some of the mist of lubricant may be induced into such chamber in the manner described in the application of Ralph N. Kircher, Serial No. 187,961, for "Means for Lubricating and Cooling Crankshafts of Two-Cycle Combustion Engines." The action of the velocity pressure passage will also help the transfer of mist of lubricant from the crankcase to the plenum chamber as the pressure drop is communicated to such chamber through the clearance between the crankshaft and the bearing. Similar benefits will result if the inner end of the velocity pressure passage opens directly into the plenum chamber instead of the bearing.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a view partly in side elevation and partly in section of a two-cycle internal combustion engine embodying the present invention;

Fig. 2 is a fragmentary sectional view taken on the line 2—2 of Fig. 1 with the crankshaft removed;

Fig. 3 is a fragmentary sectional view taken on the line 3—3 of Fig. 1 with the crankshaft removed; and Fig. 4 is a fragmentary sectional view taken on the line 4—4 of Fig. 3.

While the invention is shown applied to the upper bearing of an air-cooled single cylinder two-cycle engine designed primarily for operation with the crankshaft in a substantially vertical position, its use need not be so limited as it may be applied to any main bearing for the crankshaft of an internal combustion two-cycle engine.

As shown in the drawing, the single cylinder air-cooled two-cycle engine, indicated generally at 10, has a crankcase 12 into which a mixture of fuel, lubricating oil, and air is intermittently introduced through a crankcase intake port 14. The oil in such mixture is in the form of a mist or vapor which is compressed within the crankcase 12 as the pressure is intermittently increased during the normal operation of the engine. A support 16 for the upper bearing has a lower bore in which is mounted a plain bushing 18 having an unloaded side 19 (see Fig. 3). Above the bushing 18 the support 16 has an upper bore which forms a relatively large annularly shaped plenum chamber 20. An annular internal shoulder 22 separates the plenum chamber 20 from the bushing 18. It has an internal diameter slightly larger than the crankshaft in order to provide sufficient clearance for oil or lubricant in a fluid state to flow downwardly from the plenum chamber 20 to the bushing 18. A vertical crankshaft 24 is carried in a lower bearing 26 and passes through the upper bearing. To the upper end of the crankshaft 24 there is fixed a flywheel and magneto indicated diagrammatically at 28. The crankshaft 24 has the customary crank within the crankcase secured to a piston in a well-known manner.

The upper end of the plenum chamber is closed by an oil seal. This consists of an annular metal shell 30 press-seated on a shoulder 32 formed in the upper end of the chamber 20. Within the shell 30 there is secured a synthetic rubber gasket 34 which has a downturned annular flap 36 in rubbing contact with the surface of shaft 24. With the seal so constructed pressure developed in the plenum chamber 20 in excess of atmospheric pressure tends to increase the tightness of the fit of the seal and prevent the escape of lubricant upwardly therethrough. It is desirable to make the plenum chamber 20 sufficiently large in volume so that enough oil in the form of mist or vapor may be forced therein so that as partly condensed into liquid state there will be enough to continually supply a lubricating film between the bushing 18 and the shaft 24.

The mixture of fuel and mist of oil is transferred at high velocity from the crankcase 12 through a transfer passage 38 to the combustion chamber intake port 39 of the engine and thence into a combustion chamber 41. To make use of this high velocity, a velocity pressure passage 40 is provided in the support 16 with an inner opening 42 in a wall 43 of the transfer passage 38 and an outer opening 44 in the wall of the bearing 18. This latter opening is preferably placed on the unloaded side of such bearing where there is sufficient clearance between such bearing and the crankshaft 24 to permit transfer of the mist of lubricant from both the crankcase 12 and the plenum chamber 20 to such velocity pressure passage. When the engine is operating, the high velocity flow of fuel vapor past the opening 42 causes a pressure drop in the passage 40 which is communicated through the opening 44 and clearance between crankshaft and bearing to the crankcase 12. As a result the mist of lubricant is forced into the bearing from the crankcase. When the plenum chamber 20 is used, such pressure drop is also communicated to such chamber and this helps in charging such chamber with a mist of lubricant. The same benefits would be obtained if the opening 44 were placed directly in the wall of the plenum chamber 20.

In order to facilitate the supply of the mist of lubricant to the plenum chamber the bearing 18 is provided with an axially extending slot 46 providing communication directly from the crankcase 12 to the plenum chamber. The intermittent pressurizing of the crankcase 12 forces mist of lubricant through such slot into the plenum chamber 20 where such mist will condense to liquid state and lubricate the crankshaft bearing.

While the action of the velocity pressure passage 40 used without a plenum chamber may provide satisfactory lubrication of the entire bearing 18 because the mist of oil condenses to liquid state when forced into the clearance of the bearing and then spreads by capillary action, it is safer to also use the plenum chamber, thereby insuring a continuous supply of lubricant in liquid state at the upper end of the bearing. This safety factor is particularly desirable in those installations in which the axis of the crankshaft is in vertical position.

Although only one embodiment of the invention is shown and described herein, it will be understood that this application is intended to cover such changes or modifications as come within the spirit of the invention or scope of the following claims.

I claim:

1. In a two-cycle internal combustion engine, a combustion chamber, a crankcase, a crankcase intake port in said crankcase through which a mixture of fuel, lubricating oil and air in the form of a mist is intermittently introduced into said crankcase, a combustion chamber intake port for said combustion chamber, a fuel transfer passage leading from said crankcase to said combustion chamber intake port through which said mist is transferred at high velocity, said passage having a wall provided with an inner opening past which said mist flows, a main bearing bushing having one end connected to said crankcase; said bushing having an unloaded side, an outer opening in said unloaded side, a crankshaft in said main bearing bushing, there being sufficient clearance between said unloaded side and said crankshaft to permit transfer of part of said mist from said crankcase to said outer opening, a seal for said crankshaft outward of said bushing to prevent escape of said mist from said crankcase through said bushing, and a velocity pressure passage extending from said outer opening to said inner opening at an angle to said fuel transfer passage to permit the high velocity flow of fuel through said velocity pressure passage to cause said mist in said crankcase to enter said clearance.

2. The combination as claimed in claim 1 in which there is a plenum chamber between said bushing and said seal, and a communicating slot between said plenum chamber and said crankcase of large enough volume to receive enough of said mist to provide a continuous supply of lubricating film to said bushing upon condensation of said mist in said plenum chamber.

References Cited in the file of this patent

UNITED STATES PATENTS

| | | |
|---|---|---|
| 1,606,424 | Irgens | Nov. 9, 1926 |
| 1,652,266 | Barletta | Dec. 13, 1927 |
| 2,273,202 | Jackson | Feb. 17, 1942 |

FOREIGN PATENTS

| | | |
|---|---|---|
| 134,121 | Great Britain | Oct. 30, 1919 |
| 600,145 | France | Nov. 3, 1925 |